US012592342B2

(12) United States Patent
Yoo et al.

(10) Patent No.: US 12,592,342 B2
(45) Date of Patent: Mar. 31, 2026

(54) MULTILAYER ELECTRONIC COMPONENT

(71) Applicant: SAMSUNG ELECTRO-MECHANICS CO., LTD., Suwon-si (KR)

(72) Inventors: Jin Yeop Yoo, Suwon-si (KR); Young Hoon Song, Suwon-si (KR); Dong Ju Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 301 days.

(21) Appl. No.: 18/410,179

(22) Filed: Jan. 11, 2024

(65) Prior Publication Data

US 2024/0290542 A1    Aug. 29, 2024

(30) Foreign Application Priority Data

Feb. 28, 2023    (KR) ........................ 10-2023-0026755

(51) Int. Cl.
H01G 4/224 (2006.01)
H01G 4/12 (2006.01)
(Continued)

(52) U.S. Cl.
CPC ........... H01G 4/224 (2013.01); H01G 4/1227 (2013.01); H01G 4/30 (2013.01); *H01G 4/012* (2013.01)

(58) Field of Classification Search
CPC ........ H01G 4/012; H01G 4/30; H01G 4/1227; H01G 4/224
See application file for complete search history.

(56) References Cited

U.S. PATENT DOCUMENTS

2014/0301013 A1    10/2014  Kim
2016/0196918 A1    7/2016  Hong et al.
(Continued)

FOREIGN PATENT DOCUMENTS

JP    2017-147429 A    8/2017
JP    6627916 B2    1/2020
(Continued)

OTHER PUBLICATIONS

European Search Report dated Jul. 23, 2024 issued in the corresponding European Patent Application No. 24152865.2.

*Primary Examiner* — David M Sinclair
(74) *Attorney, Agent, or Firm* — Morgan, Lewis & Bockius LLP

(57) ABSTRACT

A multilayer electronic component includes: a body including a dielectric layer and an internal electrode alternately disposed with the dielectric layer; and an external electrode disposed on the body, in which the body includes a capacitance formation portion and margin portions disposed on both surfaces of the capacitance formation portion in a width direction, the margin portions include a first region adjacent to the capacitance formation portion, a third region adjacent to an external surface of the margin portion, and a second region disposed between the first and third regions, and G2>G1 and G2>G3 when an average grain size of a dielectric grain included in the first region is referred to as G1, an average grain size of a dielectric grain included in the second region is referred to as G2, and an average grain size of a dielectric grain included in the third region is referred to as G3.

17 Claims, 9 Drawing Sheets

(51) Int. Cl.
    *H01G 4/30*          (2006.01)
    *H01G 4/012*      (2006.01)

(56)             References Cited

U.S. PATENT DOCUMENTS

| | | | |
|---|---|---|---|
| 2017/0243697 A1 | 8/2017 | Mizuno et al. | |
| 2018/0174755 A1* | 6/2018 | Kim | H01G 4/224 |
| 2019/0035554 A1* | 1/2019 | Inomata | H01G 4/012 |
| 2020/0126722 A1* | 4/2020 | Fukunaga | H01G 4/306 |
| 2020/0126724 A1 | 4/2020 | Takagi | |
| 2022/0139625 A1 | 5/2022 | Lee et al. | |
| 2022/0139632 A1 | 5/2022 | Kim et al. | |
| 2023/0290577 A1* | 9/2023 | Tsushima | H01G 4/1218 |
| 2024/0371571 A1* | 11/2024 | Fukushima | H01G 4/1227 |

FOREIGN PATENT DOCUMENTS

| | | |
|---|---|---|
| JP | 2021-184498 A | 12/2021 |
| JP | 2022-016637 A | 1/2022 |
| KR | 10-2019-0012106 A | 2/2019 |
| KR | 10-2022-0059150 A | 5/2022 |

* cited by examiner

FIRST
DIRECTION

THIRD
DIRECTION

'A'

INVENTIVE EXAMPLE 1-1     INVENTIVE EXAMPLE 1-2     COMPARATIVE EXAMPLE 1-1

INVENTIVE EXAMPLE 1-1     INVENTIVE EXAMPLE 1-2     COMPARATIVE EXAMPLE 1-1

MULTILAYER ELECTRONIC COMPONENT

CROSS-REFERENCE TO RELATED APPLICATION (S)

This application claims benefit of priority to Korean Patent Application No. 10-2023-0026755 filed on Feb. 28, 2023, in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), one of the multilayer electronic components, is a chip-type condenser mounted on the printed circuit boards of various electronic products such as imaging devices including a liquid crystal display (LCD) and a plasma display panel (PDP), computers, smartphones, and mobile phones, and serves to charge or discharge electricity therein or therefrom.

As electronics become slimmer, smaller, and multifunctional, chip components are also required to be compact, and electronic components are also mounted to be highly-integrated. In response to this trend, a space between the mounted electronic components has been minimized.

In addition, as the industry interest in automotive electric components has recently increased, a multilayer ceramic capacitor also requires high capacitance and high reliability characteristics to be used in automobiles or infotainment systems.

A dielectric layer of a multilayer electronic component may include a perovskite material such as $BaTiO_3$ to secure a high dielectric constant. When voltage is applied to the multilayer electronic component at room temperature, expansion is performed in a thickness direction of the multilayer electronic component, and relative contraction is performed in a width direction thereof by a perovskite crystal structure of a material included in the dielectric layer. Such expansion and contraction may cause cracks in the dielectric layer, or may cause a phenomenon in which an interface between a dielectric and an internal electrode is fractured. In particular, this problem may be more pronounced in large thick film products having a relatively high applied voltage.

Accordingly, structural improvement is required to alleviate the stress caused by the expansion and contraction of the dielectric layer of the multilayer electronic component and to change a path of generated cracks.

SUMMARY

An aspect of the present disclosure is to suppress an occurrence of cracks due to the expansion and contraction of a dielectric layer when voltage is applied to a multilayer electronic component.

An aspect of the present disclosure is to prevent damage from being applied to a capacitance formation portion by transferring cracks occurring in a multilayer electronic component.

However, the aspects of the present disclosure are not limited to the above-described contents, and may be more easily understood in the process of describing specific embodiments of the present disclosure.

According to an aspect of the present disclosure, a multilayer electronic component includes: a body including a dielectric layer and an internal electrode alternately disposed with the dielectric layer, and including a first surface and a second surface opposing each other in a first direction, a third surface and a fourth surface connected to the first surface and the second surface and opposing each other in a second direction, and a fifth surface and a sixth surface connected to the first surface to the fourth surface and opposing each other in a third direction; and an external electrode disposed on the body, wherein the body comprises a capacitance formation portion in which the dielectric layer and the internal electrode are disposed to overlap each other in the first direction, and margin portions disposed on one surface and the other surface of the capacitance formation portion in the third direction, the margin portions comprise a first region adjacent to the capacitance formation portion, a third region adjacent to an external surface of the margin portion, and a second region disposed between first region and the third region, and when an average grain size of a dielectric grain included in the first region is referred to as $G1$, an average grain size of a dielectric grain included in the second region is referred to as $G2$, and an average grain size of a dielectric grain included in the third region is referred to as $G3$, $G2>G1$ and $G2>G3$ are satisfied.

According to another aspect of the present disclosure, a multilayer electronic component includes: a body including a dielectric layer and an internal electrode alternately disposed with the dielectric layer, and including a first surface and a second surface opposing each other in a first direction, a third surface and a fourth surface connected to the first surface and the second surface and opposing each other in a second direction, and a fifth surface and a sixth surface connected to the first surface to the fourth surface and opposing each other in a third direction; and an external electrode disposed on the body, wherein the body comprises a capacitance formation portion in which the dielectric layer and the internal electrode are disposed to overlap each other in the first direction, and margin portions disposed on one surface and the other surface of the capacitance formation portion in the third direction, the margin portions comprise a first region adjacent to the capacitance formation portion, a third region adjacent to an external surface of the margin portion, and a second region disposed between first region and the third region, and when a ratio of a content of Ti ions to a content of Ba ions included in the first region is referred to as $C1$, a ratio of a content of Ti ions to a content of Ba ions included in the second region is referred to as $C2$, and a ratio of a content of Ti ions to a content of Ba ions included in the third region is referred to as $C3$, $C2>C1$ and $C2>C3$ are satisfied.

One of effects of the present disclosure is to suppress an occurrence of cracks in a multilayer electronic component by improving the strength of a margin portion itself.

One of effects of the present disclosure is to effectively change a transfer path of cracks occurring by forming a grain growth region in a specific region of a margin portion.

Advantages and effects of the present application are not limited to the foregoing content and may be more easily understood in the process of describing a specific exemplary embodiment of the present disclosure.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
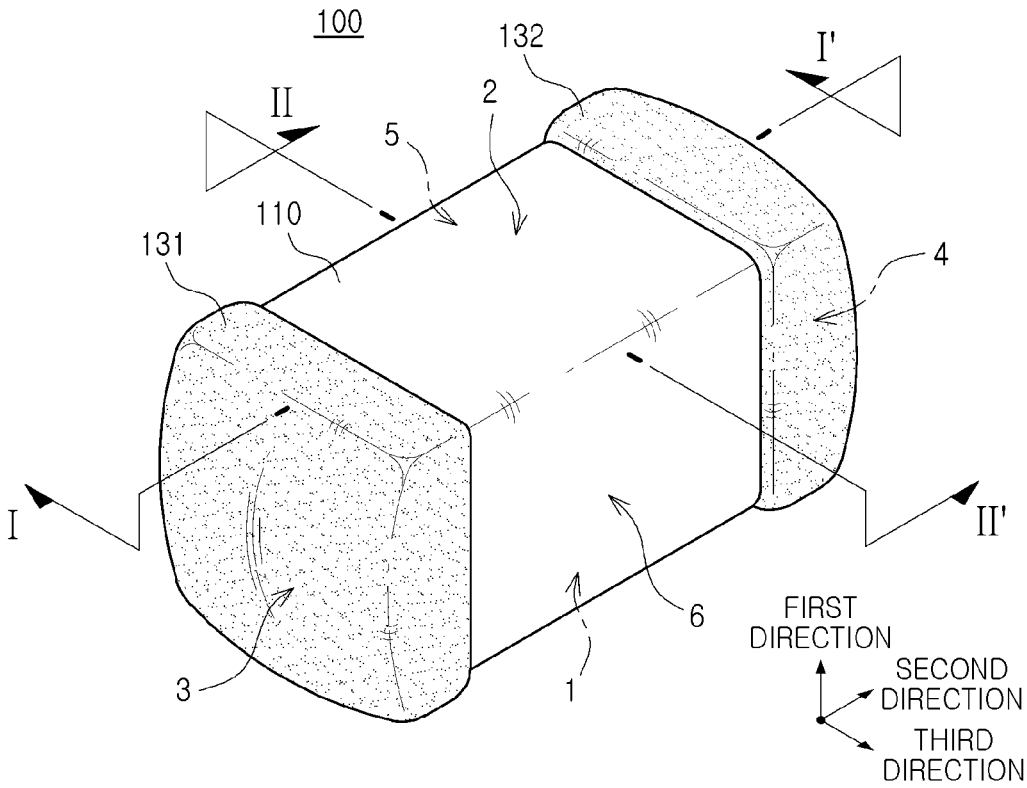
FIG. 1 is a perspective view schematically illustrating a multilayer electronic component according to an exemplary embodiment of the present disclosure.

Hereinafter, exemplary embodiments of the present disclosure will be described with reference to specific exemplary embodiments and the attached drawings. The exemplary embodiments of the present disclosure may, however, be exemplified in many different forms and should not be construed as being limited to the specific embodiments set forth herein. Furthermore, the exemplary embodiments disclosed herein are provided for those skilled in the art to better explain the present disclosure. In the drawings, the shapes and dimensions of elements may be exaggerated for clarity, and the same reference numerals will be used throughout to designate the same or like elements.

In addition, in order to clearly describe the present disclosure in the drawings, the contents unrelated to the description are omitted, and since sizes and thicknesses of each component illustrated in the drawings are arbitrarily shown for convenience of description, the present disclosure is not limited thereto. In addition, components with the same function within the same range of ideas are described using the same reference numerals. Throughout the specification, when a certain portion "includes" or "comprises" a certain component, this indicates that other components are not excluded and may be further included unless otherwise noted.

In the drawings, a first direction may be defined as a direction in which first and second internal electrodes are alternately disposed with the dielectric layer interposed therebetween, or a thickness T direction, and among second and third directions, perpendicular to the first direction, a second direction may be defined as a length L direction, and a third direction may be defined as a width W direction.

FIG. 1 is a perspective view schematically illustrating a multilayer electronic component according to an exemplary embodiment of the present disclosure.

Figure 2:
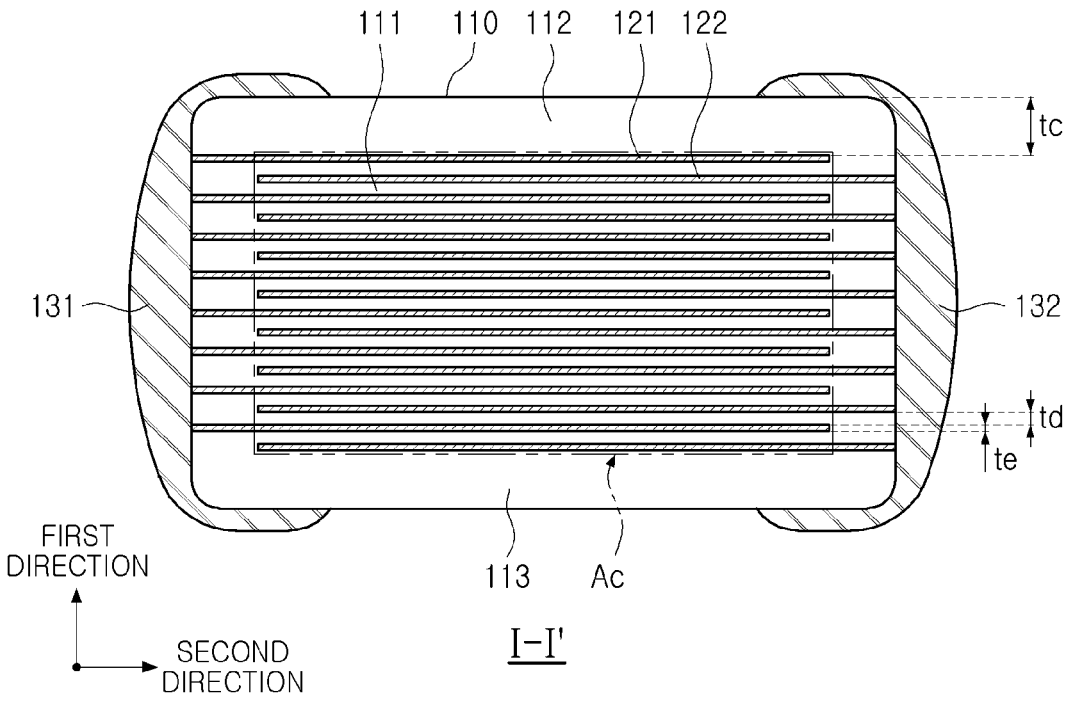
FIG. 2 is a cross-sectional view taken along line I-I' of FIG. 1.

FIG. 2 is a cross-sectional view taken along line I-I' of FIG. 1.

Figure 3:
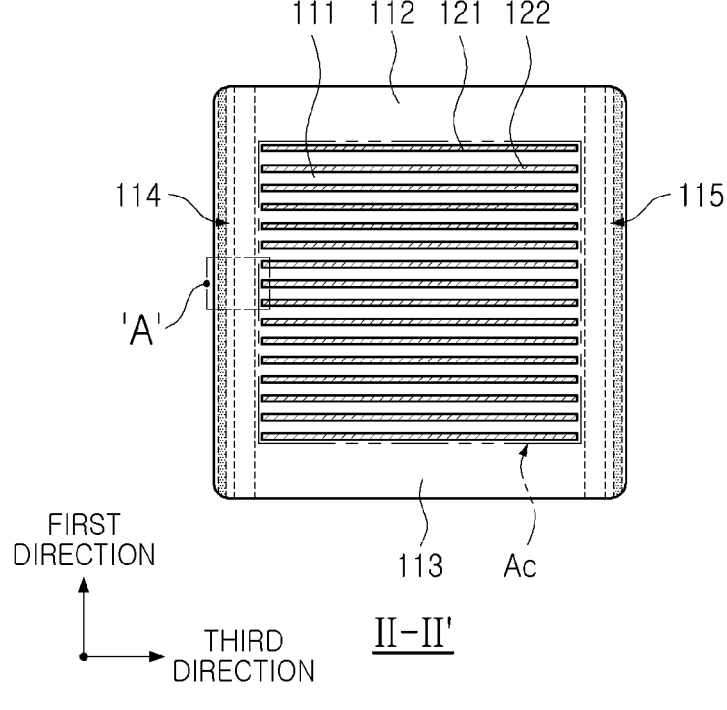
FIG. 3 is a cross-sectional view taken along line II-II' of FIG. 1.

FIG. 3 is a cross-sectional view taken along line II-II' of FIG. 1.

Figure 4:
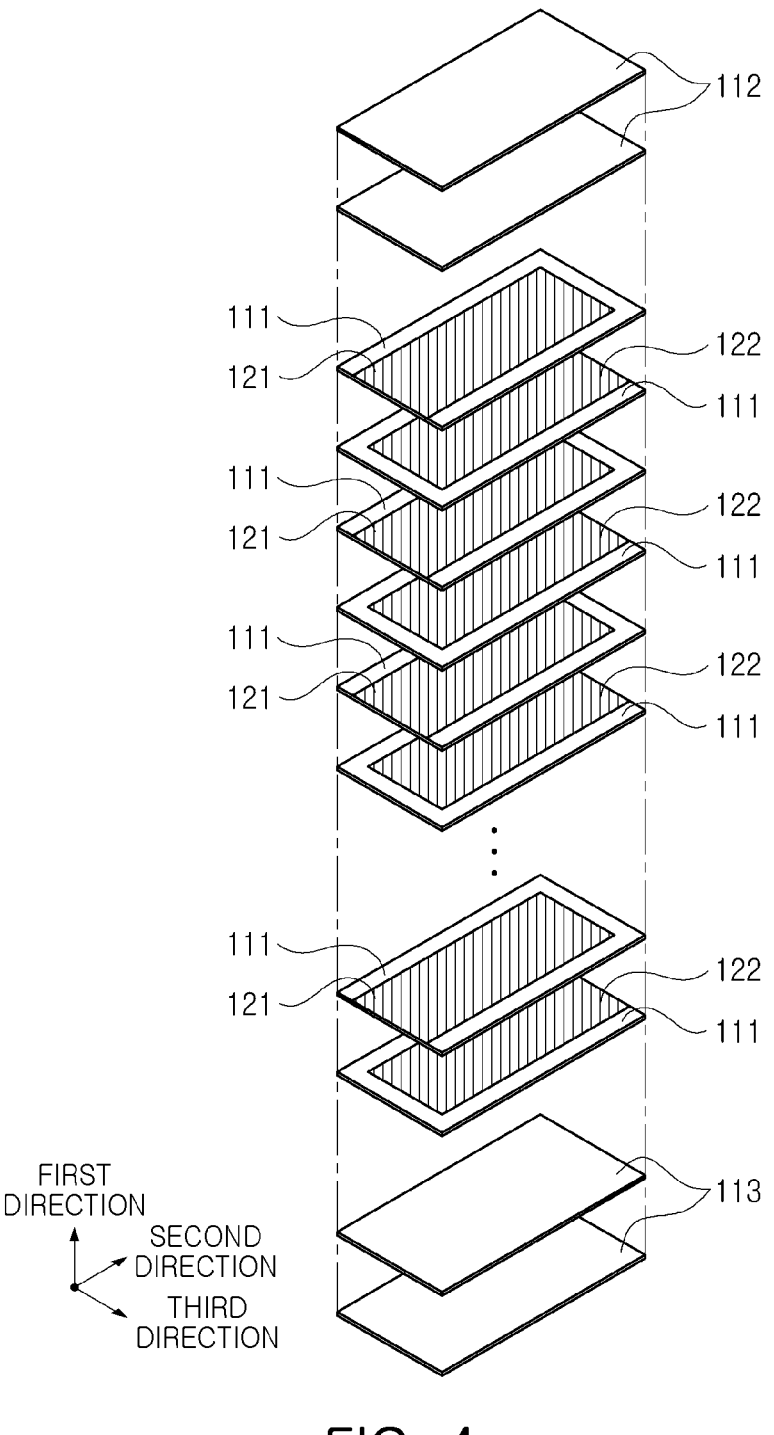
FIG. 4 is an exploded perspective view illustrating a body according to an exemplary embodiment of the present disclosure.

FIG. 4 is an exploded perspective view illustrating a body according to an exemplary embodiment of the present disclosure.

Figure 5:
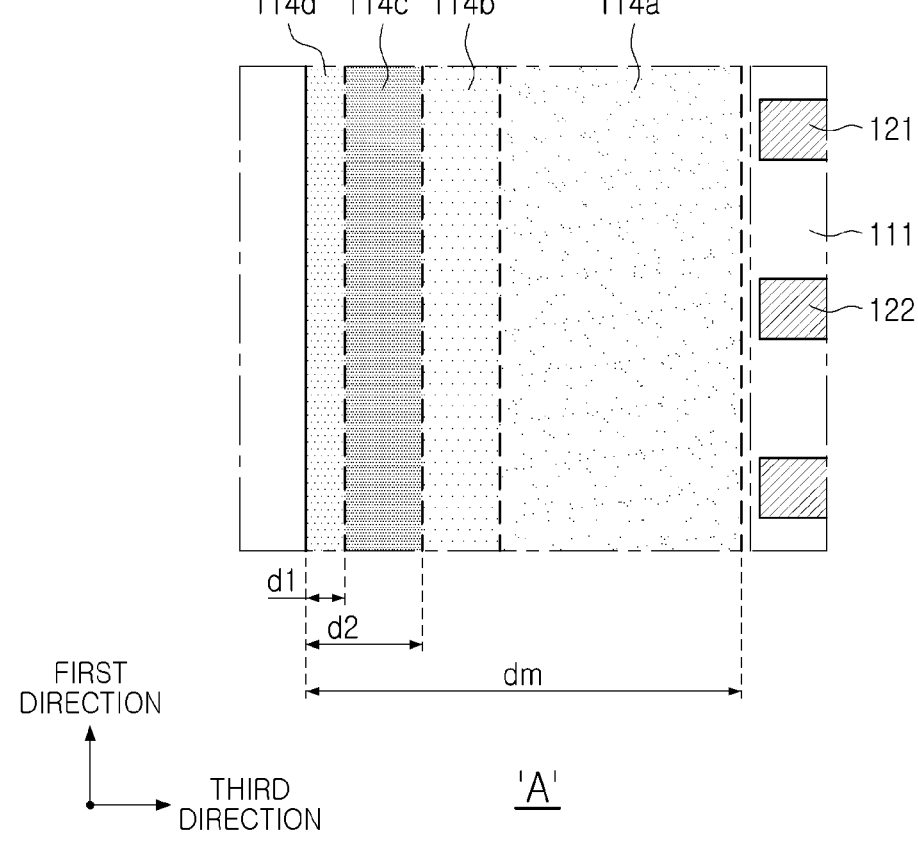
FIG. 5 is an enlarged view of region A of FIG. 3.
Figure 6:
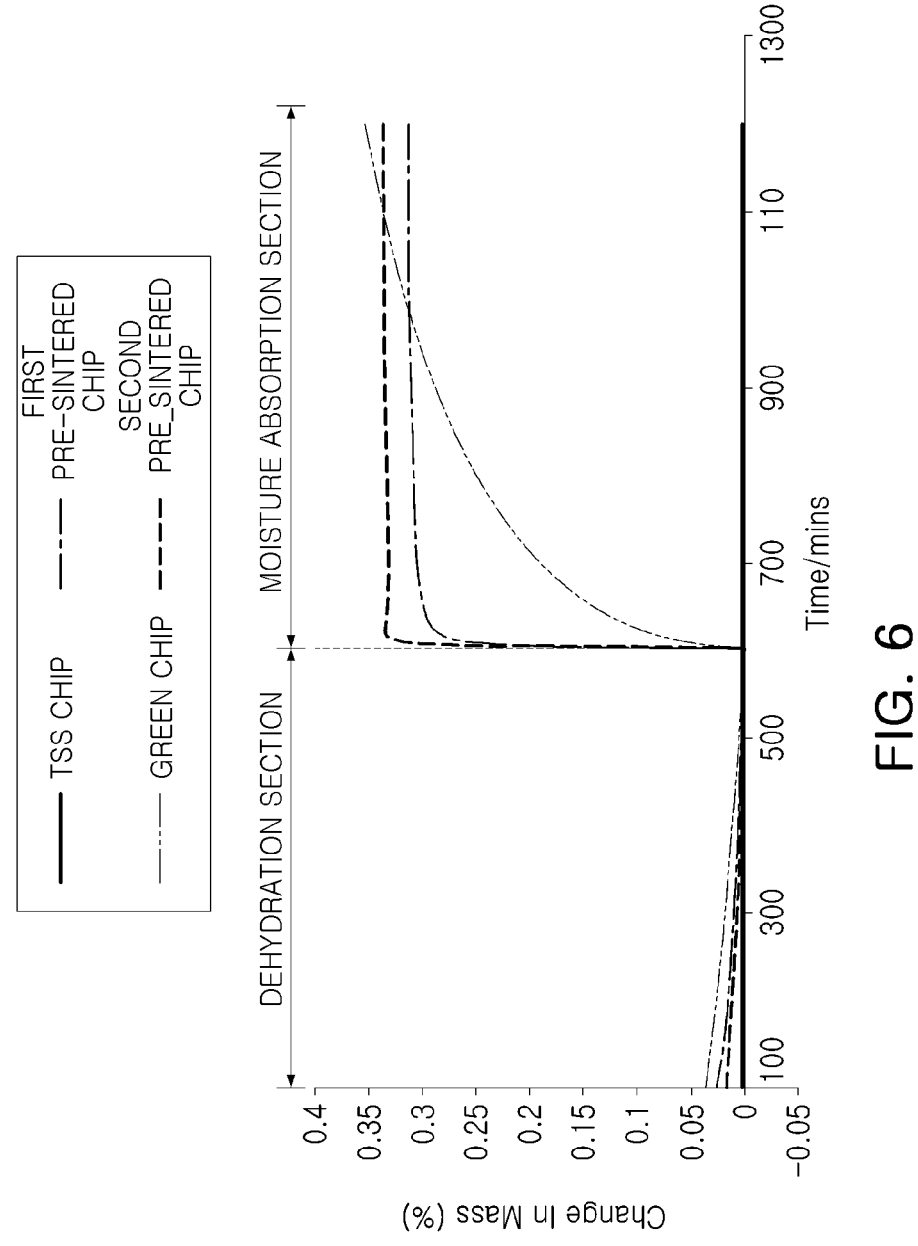
FIG. 6 is a graph illustrating results of measuring a moisture absorption rate according to the timing of performing a process of applying $TiO_2$.

FIG. 5 is an enlarged view of region A of FIG. 3;

FIG. 6 is a graph illustrating results of measuring a moisture absorption rate according to the timing of performing a process of applying $TiO_2$.

Figure 7A:
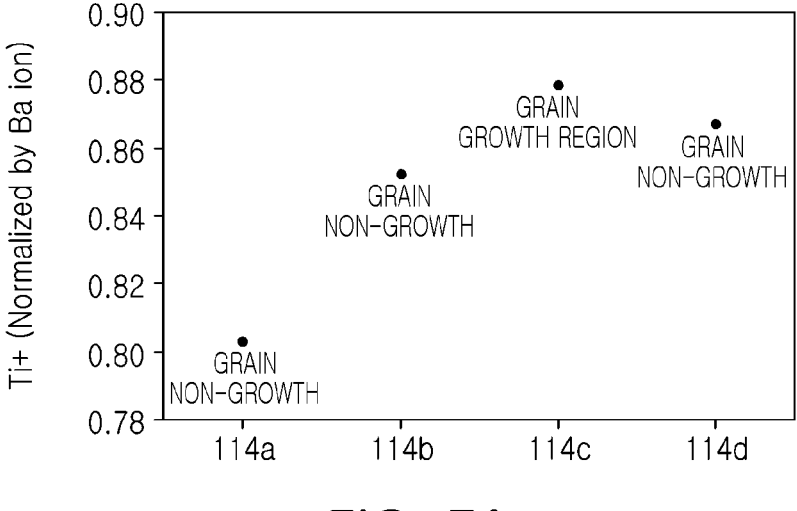
FIG. 7A is a graph illustrating a ratio of a content of Ti ions to a content of Ba ions included in each region of a margin portion according to an exemplary embodiment.
Figure 7B:
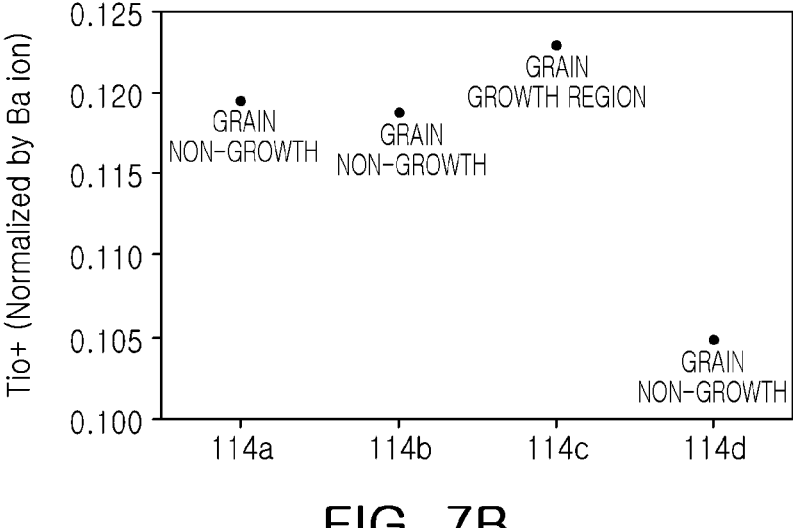
FIG. 7B is a graph illustrating a ratio of a content of TiO ions to the content of Ba ions included in each region of the margin portion according to an exemplary embodiment.

FIG. 7A is a graph illustrating a ratio of a content of Ti ions to a content of Ba ions included in each region of a margin portion according to an exemplary embodiment, and FIG. 7B is a graph illustrating a ratio of a content of TiO ions to the content of Ba ions included in each region of the margin portion according to an exemplary embodiment.

Hereinafter, a multilayer electronic component 100 according to an exemplary embodiment of the present disclosure will be described in detail with reference to FIGS. 1 to 7.

A body 110 includes a dielectric layer 111 and internal electrodes 121 and 122 alternately disposed with the dielectric layer 111.

There is no particular limitation on a specific shape of the body 110, but as illustrated, the body 110 may have a hexahedral shape or a shape similar thereto. Due to the shrinkage of ceramic powder particles included in the body 110 during a sintering process, the body 110 is not a hexahedral shape with a complete straight line, but may have a substantially hexahedral shape.

The body 110 may have a first surface 1 and a second surface 2 opposing each other in the first direction, a third surface 3 and a fourth surface 4 connected to the first surface 1 and the second surface 2 and opposing each other in the second direction, a fifth surface 5 and a sixth surface 6 connected to the first surface 1 and the second surface 2, connected to the third surface 3 and the fourth surface 4, and opposing each other in the third direction.

Since a plurality of dielectric layers 111 forming the body 110 are in a sintered state, a boundary between adjacent dielectric layers 111 may be integrated to the extent that the boundary may be difficult to confirm without using a scanning electron microscope (SEM).

According to an exemplary embodiment of the present disclosure, materials for forming the dielectric layer 111 is not particularly limited as long as they can obtain sufficient capacitance. For example, a barium titanate-based material, a lead composite perovskite-based material, or a strontium titanate-based material may be used as the materials therefor. The barium titanate-based material may include $BaTiO_3$-based ceramic powder particles, and examples of the ceramic powder particles may include $BaTiO_3$, $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$) or $Ba(Ti_{1-y}Zr_y)O_3$ ($0<y<1$) which is formed by partially employing calcium (Ca) and zirconium (Zr) in $BaTiO_3$, or the like.

Furthermore, as the materials forming the dielectric layer 111, various ceramic additives, organic solvents, binders, dispersants, and the like, may be added to powder particles such as barium titanate ($BaTiO_3$) depending on the purpose of the present disclosure.

The body 110 may include a capacitance formation portion Ac which is disposed in the body 110 and is a region in which the first and second internal electrodes 121 and 122 overlap each other in the first direction.

The capacitance formation portion Ac is a portion that contributes to a capacitance formation of a capacitor, and may be formed by repeatedly stacking a plurality of first and second internal electrodes 121 and 122 with the dielectric layer 111 interposed therebetween.

In an exemplary embodiment, an upper cover portion 112 may be disposed on one surface of the capacitance formation portion Ac in the first direction, and a lower cover portion 113 may be disposed on the other surface of the capacitance formation portion Ac in the first direction.

The upper cover portion 112 and the lower cover portion 113 may be formed by stacking a single dielectric layer or two or more dielectric layers on the upper and lower surfaces of the capacitance formation portion Ac in a thickness direction, and may basically serve to prevent damage to the internal electrodes due to physical or chemical stress.

The upper cover portion 112 and the lower cover portion 113 do not include the internal electrodes, and may include the same material as the dielectric layer 111.

That is, the upper cover portion 112 and the lower cover part 113 portion may include a ceramic material, and may include, for example, a barium titanate (BaTiO₃)-based ceramic material.

An average thickness of the cover portions 112 and 113 needs not be particularly limited, but the average thickness tc of the cover portion 112 and 113 may be 50 μm or more and 500 μm or less. Here, the average thickness tc of the cover portions 112 and 113 may denote an average thickness of each of the first cover portion 112 and the second cover portion 113.

The average thickness tc of the cover portions 112 and 113 may denote a size in the first direction, and may be a value obtained by averaging first directional sizes of the cover portions 112 and 113 measured at five points spaced apart from each other at equal intervals in an upper portion or a lower portion of the capacitance formation portion Ac.

Referring to FIG. 3, in an exemplary embodiment, margin portions 114 and 115 may be disposed on one surface and the other surface of the capacitance formation portion Ac in the third direction.

As illustrated in FIG. 3, the margin portions 114 and 115 may denote a third directional region between both ends of the first and second internal electrodes 121 122 and a boundary surface of the body 110.

The margin portions 114 and 115 may basically serve to prevent damage to the internal electrode due to physical or chemical stress.

The margin portions 114 and 115 may be formed by applying a conductive paste except for a region in which the margin portions will be formed on a ceramic green sheet, and forming the internal electrode.

Alternatively, in order to suppress a step portion caused by the internal electrodes 121 and 122, the internal electrodes 121 and 122 may be stacked and then cut to be exposed to the fifth surface 5 and the sixth surface 6 of the body, and then, the margin portions 114 and 115 may be formed by stacking a single dielectric layer or two or more dielectric layers on both side surfaces of the capacitance formation portion Ac in the third direction (width direction).

On the other hand, an average width of the margin portions 114 and 115 in the third direction is not particularly limited, but an average width dm of the margin portions 114 and 115 in the third direction may be, preferably, 10 μm to 500 μm.

The average width dm of the margin portions 114 and 115 in the third direction may denote an average size of the margin portions 114 and 115 in the third direction, and may be a value obtained by averaging third directional sizes of the margin portions 114 and 115 measured at five points spaced apart from each other at equal intervals on a side surface of the capacitance formation portion Ac.

The internal electrodes 121 and 122 are alternately disposed with the dielectric layer 111 in the first direction.

The internal electrodes 121 and 122 may include first and second internal electrodes 121 and 122. The first and second internal electrodes 121 and 122 may be alternately disposed to oppose each other with the dielectric layer 111 forming the body 110 interposed therebetween, and may be connected to the third surface 3 and the fourth surface 4 of the body 110, respectively. Specifically, one end of the first internal electrode 121 may connected to the third surface, and one end of the second internal electrode 122 may be connected to the fourth surface. That is, in an exemplary embodiment, the internal electrodes 121 and 122 may be in contact with the third surface 3 or the fourth surface 4.

As illustrated in FIG. 2, the first internal electrode 121 may be spaced apart from the fourth surface 4 and may be exposed through the third surface 3, and the second internal electrode 122 may be spaced apart from the third surface 3 and may be exposed through the fourth surface 4. A first external electrode 131 may be disposed on the third surface 3 of the body and connected to the first internal electrode 121, and a second external electrode 132 may be disposed on the fourth surface 4 of the body and connected to the second internal electrode 122.

That is, the first internal electrode 121 is not connected to the second external electrode 132 and is connected to the first external electrode 131, and the second internal electrode 122 is not connected to the first external electrode 131 and is connected to the second external electrode 132. Accordingly, the first internal electrode 121 may be formed to be spaced apart from the fourth surface 4 by a predetermined distance, and the second internal electrode 122 may be formed to be spaced apart from the third surface 3 by a predetermined distance. In this case, the first and second internal electrodes 121 and 122 may be electrically separated from each other by the dielectric layer 111 disposed in the middle.

In this case, in the body 110, a space from an end of the first internal electrode 121 in the second direction to the fourth surface 4, and a space from an end of the second internal electrode 122 in the second direction to the third surface 3 may be referred to as the margin portions 114 and 115.

Referring to FIG. 4, the body 110 may be formed by alternately stacking a ceramic green sheet on which the first internal electrode 121 is printed and a ceramic green sheet on which the second internal electrode 122 is printed, and then sintering the ceramic green sheets.

A material for forming the internal electrodes 121 and 122 is not particularly limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

Furthermore, the internal electrodes 121 and 122 may be formed by printing a conductive paste for internal electrodes including at least one of nickel (Ni), copper (Cu), palladium (Pd), silver (Ag), gold (Au), platinum (Pt), tin (Sn), tungsten (W), titanium (Ti) and alloys thereof, on the ceramic green sheet. A method of printing the conductive paste for the internal electrodes may be a screen-printing method, a gravure printing method, but the present disclosure is not limited thereto.

The external electrodes 131 and 132 may be disposed on the third surface or the fourth surface of the body 110. Specifically, the first external electrode 131 is disposed on the third surface 3 and connected to the first internal electrode 121, and the second external electrode 132 is disposed on the fourth surface 4 and connected to the second internal electrode 122.

Although this exemplary embodiment describes a structure in which the multilayer electronic component 100 has two external electrodes 131 and 132, but the number or shape of the external electrodes 131 and 132 may vary, according to the shape of the internal electrodes 121 and 122 or other purpose.

On the other hand, the external electrodes 131 and 132 may be formed using any material as long as the material has electrical conductivity such as metal, and a specific material may be determined in consideration of electrical characteristics, structural stability, and the like, and also, the external electrodes 131 and 132 may have a multilayer structure.

For example, the external electrodes 131 and 132 may include an electrode layer disposed on the body 110 and a plating layer formed on the electrode layer.

For a more specific example of the electrode layer, the electrode layer may be a sintered electrode including conductive metal and glass, or a resin-based electrode including conductive metal and resin.

Furthermore, the electrode layer may have a shape in which the sintered electrode and the resin-based electrode are sequentially formed on the body. Furthermore, the electrode layer may be formed by transferring a sheet including the conductive metal on the body, or by transferring a sheet including the conductive metal on the sintered electrode.

A material having excellent electrical conductivity may be used as the conductive metal included in the electrode layer, and is not particularly limited. For example, the conductive metal may be one or more of nickel (Ni), copper (Cu), and alloys thereof.

The plating layer serves to improve mounting properties. The type of the plating layer is not particularly limited, and may be a plating layer including at least one of Ni, Sn, Pd and alloys thereof, and the plating layer may be formed of a plurality of layers.

As a specific example of the plating layer, the plating layer may be a Ni plating layer or a Sn plating layer, may be a form in which the Ni plating layer and the Sn plating layer are sequentially formed on the electrode layer, and may be a form in which the Sn plating layer, the Ni plating layer, and the Sn plating layer are sequentially formed thereon. Furthermore, the plating layer may include a plurality of Ni plating layers and/or a plurality of Sn plating layers.

An average thickness of the first and second internal electrodes 121 and 122 and an average thickness of the dielectric layer 111 may have various values. Specifically, for an IT multilayer electronic component, the average thickness of the first and second internal electrodes 121 and 122 and the average thickness of the dielectric layer 111 may be 0.35 μm or less, respectively, and a high voltage electric and electronic multilayer electronic component may have an average thickness of the first and second internal electrodes 121 and 122 and an average thickness of the dielectric layer 111 larger than those of the IT multilayer electronic component.

In general, a major issue for the high voltage electric and electronic multilayer electronic component is a decrease in reliability due to a decrease in insulation breakdown voltage under a high-voltage environment. In an exemplary embodiment, when an average thickness of the first and second internal electrodes 121 and 122 is referred to as te, and an average thickness of the dielectric layer 111 is referred to as td, $td > 2 \times te$ may be satisfied to increase a thickness td of the dielectric layer 111 as a distance between the internal electrodes 121 and 122, thereby improving insulation breakdown voltage characteristics.

On the other hand, an absolute value of the average thickness of the first and second internal electrodes 121 and 122 and the average thickness of the dielectric layer 111 is not particularly limited. In an exemplary embodiment, when the average thickness of the first and second internal electrodes 121 and 122 is referred to as te and the average thickness of the dielectric layer 111 is referred as td, te may be less than 1 μm, and td may be less than 2.8 μm.

The average thickness td of the dielectric layer 111 may denote a first directional average size of the dielectric layer 111 disposed between the first and second internal electrodes 121 and 122. Meanwhile, when the body 110 includes a plurality of dielectric layers 111, the average thickness td of the dielectric layer 111 may denote an average thickness of at least one of a plurality of dielectric layers 111.

The average thickness td of the dielectric layer 111 may be measured by scanning an image of a cross-section of the body 110 in a length and thickness (L-T) direction (i.e., a first and second direction) with a scanning electron microscope (SEM) of 10,000× magnification. More specifically, an average value may be measured by measuring the thickness at 30 points of one dielectric layer in the scanned image, which are spaced apart from each other at equal intervals in a length direction. The 30 points spaced apart from each other at equal intervals may be designated in the capacitance formation portion Ac. In addition, when the average value is measured by extending an average value measurement up to 10 dielectric layers 111, the average thickness of the dielectric layer may be further generalized. Other measurement methods and/or tools appreciated by one of ordinary skill in the art, even if not described in the present disclosure, may also be used.

An average thickness te of the internal electrodes 121 and 122 may denote an average size of the internal electrodes 121 and 122 in the first direction. Meanwhile, when the body 110 includes a plurality of internal electrodes 121 and 122, an average thickness td of the internal electrodes 121 and 122 may denote an average thickness of at least one of the plurality of internal electrodes 121 and 122.

The average thickness of the internal electrodes 121 and 122 may be measured by scanning an image of a cross-section of the body 110 in a length and thickness (L-T) direction (i.e., a first and second direction) with a scanning electron microscope (SEM) of 10,000× magnification. More specifically, an average value may be measured by measuring the thickness at 30 points of one internal electrode in the scanned image, which are spaced apart from each other at equal intervals in a length direction. The 30 points spaced apart from each other at equal intervals may be designated in the capacitance formation portion Ac. In addition, when the average value is measured by extending an average value measurement up to 10 internal electrodes, the average thickness of the internal electrode may be further generalized. Other measurement methods and/or tools appreciated by one of ordinary skill in the art, even if not described in the present disclosure, may also be used.

Referring to FIG. 3, the margin portions 114 and 115 according to an exemplary embodiment of the present disclosure may be divided into three or more different regions. FIG. 4 illustrates each region of a margin portion based on the first margin portion 114, which may be similarly applied to the second margin portion 115.

A dielectric layer of the multilayer electronic component may include a perovskite material such as $BaTiO_3$ so as to secure a high dielectric constant. When voltage is applied to a multilayer electronic component at room temperature, expansion may be performed in a thickness direction of the electronic component, and relative contraction may be performed in a width direction by a perovskite crystal structure of a material included in the dielectric layer. Such expansion and contraction may cause cracks in the dielectric layer, or may cause a phenomenon in which an interface between a dielectric and an internal electrode is fractured. Specifically, this problem may be more pronounced in large thick film products having a relatively high applied voltage.

Accordingly, in the present disclosure, stress caused by the expansion and contraction of the multilayer electronic component may be alleviated by adjusting a degree of grain growth according to each region of the margin portion or a content of Ti ions, and when the cracks occur, a change in a path of the cracks may be induced to suppress a phenomenon in which the cracks is transferred to the capacitance formation portion Ac.

The margin portion 114 according to an exemplary embodiment of the present disclosure may include first regions 114a and 114b adjacent to the capacitance formation portion Ac, a third region 114d adjacent to an external surface of the margin portion 114, and a second region 113c disposed between the first regions 114a and 114b and the third region 114d. In this case, when an average grain size of a dielectric grain included in the first regions 114a and 114b is referred to as G1, an average grain size of a dielectric grain included in the second region 114c is referred to as G2 and an average grain size of a dielectric grain included in the third region 114d is referred to as G3, G2>G1 and G2>G3 are satisfied. Accordingly, the occurrence of the cracks may be suppressed by improving the strength of the margin portion 114 itself, and a path change of the cracks may be induced so that the occurring cracks are not transferred to the capacitance formation portion Ac.

A method of distinguishing the first to third regions 114a, 114b, 114c and 114d is not particularly limited. For example, in first and third directional cross-sections in which the multilayer electronic component 100 is polished to a center thereof in the second direction, through a dark field mode of an optical microscope (OM), a layer subjected to grain growth by diffusing Ti may be observed to be darker than other margin regions, and through the scanning electron microscope (SEM), a grain boundary of a margin dielectric may be clarified through a polishing process, and an average grain size of the dielectric grain may be directly measured and distinguished. In this case, the average grain size of the dielectric grain may be an average value measured in five or more regions spaced apart from each other at arbitrary intervals in the first direction for each region. Other measurement methods and/or tools appreciated by one of ordinary skill in the art, even if not described in the present disclosure, may also be used.

As another method of distinguishing the first to third regions 114a, 114b, 114c and 114d, there is a method of measuring a ratio of a content of Ti ions to a content of Ba ions using a secondary ion mass spectroscopy (SIMS).

In another method of distinguishing the first to third regions 114a, 114b, 114c and 114d, the first to third regions may be distinguished by measuring the content of the Ti element for each depth in each region from an external surface of the margin portion 114 to the capacitance formation portion using Depth Profiling of X-ray Photoelectron Spectroscopy.

A method of adjusting a dielectric grain size included in the first to third regions 114a, 114b, 114c and 114d to satisfy G2>G1 and G2>G3 is not particularly limited. For example, a grain growth region may be formed in the second region 114c by mixing the binder and $TiO_2$ sol, applying the mixture to the external surface of the margin portion 114, and then including a diffusion of Ti ions or TiO ions through sintering, and controlling a content of Ti ions as compared to a content of Ba ions included in the first to third regions 114a, 114b, 114c and 114d.

When a Ti-rich liquid layer is formed on the grain boundary of the dielectric grain included in the margin portion 114 during the sintering process, rapid growth of the dielectric grain may occur, and this may be a method of forming the second region 114c as a grain growth region.

That is, in the multilayer electronic component according to an exemplary embodiment of the present disclosure, when a ratio of a content of Ti ions to a content of Ba ions included in the first regions 114a and 114b is referred to as C1, a ratio of a content of Ti ions to a content of Ba ions included in the second region 114c is referred to as C2, and a ratio of a content of Ti ions to a content of Ba ions included in the third region 114d is referred to as C3, C2>C1 and C2>C3 may be satisfied. Accordingly, in the first to third regions, the second region 114c may be formed to be a grain growth region, the cacks may be suppressed improving the strength of the margin portion 114 itself, and the path change of the cracks may be induced so that the occurring cracks are not transferred to the capacitance formation portion Ac.

A method of adjusting a ratio of a content of Ti ions to a content of Ba ions or a grain growth of the first to third regions 114a, 114b, 114c and 114d is not particularly limited. For example, a $TiO_2$ sol mixture liquid to which a binder is added may be painted using a brush, dipped, or applied, using a roller, to the external surface of the margin portion 114 in which a region is not distinguished, and the mixture may be diffused to adjust the ratio of the content of Ti ions to the content of Ba ions or the grain growth of the first to third regions 114a, 114b, 114c and 114d.

In this case, there may be a difference in the moisture absorption rate of $TiO_2$ depending on a process state of the body 110, which is expected to be due to a change in porosity of the margin portion 114 according to the amount of evaporation of a binder component.

FIG. 6 is a graph illustrating results of measuring a moisture absorption rate according to the timing of performing a process of applying $TiO_2$. Depending on process conditions of each chip, there was a difference in application power of $TiO_2$ sol, and in order to confirm the difference in a moisture absorption rate depending on process conditions, a moisture absorption rate evaluation according to FIG. 6 was conducted by performing dehumidification at a temperature of 60° C. and relative humidity of 0% for 10 hours, and maintaining an environment having a temperature of 60° C. and relative humidity of 85% for 10 hours.

A chip cut in a state in which the internal electrode and the dielectric layer were stacked was used as a green chip, a chip pre-sintered at 300° C. or higher for less than 80 hours was referred to as a first pre-sintered chip, a chip pre-sintered at 600° C. or higher for more than 5 hours after the first pre-sintering chip was used as a second pre-sintered chip, and a chip sintered at 1000° C. or higher after the secondary pre-sintering was used as a two-step sintering (TSS) chip.

Referring to FIG. 6, it may be confirmed that an initial $TiO_2$ moisture absorption rate is reduced in the order of the second pre-sintered chip, the first pre-sinteredchip, the green chip, and the TSS chip, and it may be confirmed that the $TiO_2$ initial moisture absorption rate of the second pre-sintered chip is the highest. Accordingly, applying $TiO_2$ to the second pre-sintered chip may be most advantageous in forming the second region 114c, which is a grain growth region.

FIG. 7A is a graph illustrating a ratio of a content of Ti ions to a content of Ba ions included in each region of a margin portion according to an exemplary embodiment, and FIG. 7B is a graph illustrating a ratio of a content of TiO ions to the content of Ba ions included in each region of the margin portion according to an exemplary embodiment.

As described above, a content of Ti ions compared to a content of Ba ions or a content of TiO ions compared to the content of Ba ions in each region of the margin portion 114 may be calculated as a ratio of the intensity of the Ti ions or the TiO ions to the intensity of the Ba ions, using a secondary ion mass spectroscopy (SIMS), and the unit corresponds to an arbitrary unit.

Specifically, after polishing the multilayer electronic component 100 to the center thereof in the second direction to expose a first directional surface and a third directional surface, secondary ions generated while sputtering in the third direction from the external surface of the margin portion 114 to the capacitance formation portion Ac may be analyzed with a mass spectrometer, thus measuring a ratio of the content of Ti ions to the content of Ba ions or a ratio of the content of TiO ions to the content of Ba ions.

The ratio of the content of Ti ions to the content of Ba ions or a ratio of the content of TiO ions to the content of Ba ions in each region of the margin portion 114 may be further generalized by performing measurements five or more times at any point in the first direction to obtain an average value.

Referring to FIGS. 7A and 7B, it may be confirmed that a grain growth region is formed in the second region 114c, and that a grain non-growth region is formed in the first regions 114a and 114b and the third region 114d. In this case, the grain growth region may refer to a region in which the average size of the dielectric grain is 2 μm or more and 5 μm or less, and the grain non-growth region may refer to a region in which the average size of the dielectric grain is less than 2 μm.

Referring to FIGS. 7A and 7A, in an exemplary embodiment, when a ratio of a content of Ti ions to a content of Ba ions included in the first regions 114a and 114b is referred to as C1, a ratio of a content of Ti ions to a content of Ba ions included in the second region 114c is referred to as C2, and a ratio of a content of Ti ions to a content of Ba ions included in the third region 114d is referred to as C3, it may be confirmed that C2>C1 and C2>C3 are satisfied. Accordingly, in the first to third regions, the second region 114c may be formed to be a grain growth region, an occurrence of cracks may be suppressed by improving the strength of the margin portion 114 itself, and a path change of the cracks may be induced so that the occurring cracks are not transferred to the capacitance formation portion Ac.

In an exemplary embodiment, the first regions 114a and 114b may include a first-first region 114a in contact with the capacitance formation portion Ac and a first-second region 114b adjacent to the second region 114c.

In this case, a ratio of a content of Ti ions to a content of Ba ions included in the first-first region is referred to as C1-1, and a ratio of a content of Ti ions to a content of Ba ions included in the first-second region is referred to as C1-2, C2>C3>C1-2>C1-1 may be satisfied. Accordingly, the margin portion 114 may be divided into four regions having different average dielectric grain diameters, so that an effect of improving the strength of the margin portion 114 itself and inducing a path change of cracks that may occur may become more remarkable.

On the other hand, some of the Ti ions included in the margin portion 114 may exist in the form of TiO ions by being coupled to oxygen in the atmosphere during diffusion. Referring to FIGS. 7A and 7B, in an exemplary embodiment, when a ratio of a content of TiO ions to a content of Ba ions included in the first regions 114a and 114b is referred to as C1', a ratio of a content of TiO ions to a content of Ba ions included in the second region 114c is referred to as C2', a ratio of a content of TiO ions to a content of Ba ions included in the third region 114d is referred to as C3', C2'>C1 '>C3' may be satisfied.

Referring to FIG. 5, an average width dm of the margin portion 114 and a formation position of the second region 114c may be defined by using d1 and d2.

In an exemplary embodiment, an average distance d1 in the third direction from an external surface of the margin portion 114 to one end of the second region 114c in the third direction adjacent to the external surface of the margin portion 114 may be 30 μm or more and 50 μm or less. Accordingly, the second region 114c in which a ratio of a content of Ti ions to a content of Ba ions is higher than that of a surrounding region or an average grain size of a dielectric grain is larger than that of the surrounding region may be disposed in a proper position, an effect of improving the strength of the margin portion 114 itself and an effect of inducing a path change of cracks that may occur may become more remarkable.

In an exemplary embodiment, an average distance d2-d1 in the third direction from one end of the second region 114c in the third direction adjacent to the external surface of the margin portion 114 to the other end of the second region 114c in the third direction may be 20 μm or more and 150 μm or less. Accordingly, the second region 114c in which a ratio of a content of Ti ions to a content of Ba ions is higher than that of the surrounding region or an average grain size of a dielectric grain is larger than that of the surrounding region may appropriately adjust a proportion occupied in the margin portion 114, so that an effect of improving the strength of the margin portion 114 itself and an effect of inducing a path change of cracks that may occur may become more remarkable.

The average distance d1 and the average distance d2-d1 in the third direction may denote an average width of the third region 114d and an average width of the second region 114c, respectively, in the third direction, and may be a value obtained by averaging third directional sizes of the third region 114d or the second region 114c of the margin portion 114 measured at five points spaced apart from each other at equal intervals on a side surface of the third region 114d or the second region 114c.

In an embodiment, an average width of the margin portion 114 in the third direction may be 200 μm or more. In the case of a large-sized multilayer electronic component having an average width of 200 μm or more, a relatively high voltage may be applied thereto as compared to a medium or small-sized multilayer electronic component. When the applied voltage is high, a phenomenon of fracturing between the dielectric layer 111 and the internal electrodes 121 and 122 by increasing a degree of contraction and expansion of the dielectric layer 111 and a phenomenon of an occurrence of cracks in the dielectric layer 111 may be further increased.

According to an exemplary embodiment of the present disclosure, the stress caused by the expansion and contraction of the multilayer electronic component may be alleviated by adjusting a degree of grain growth or the content of Ti ions according to each region of the margin portion 114, and when cracks occur, the path change of the cracks may be induced, and accordingly, even in the case of high-pressure and large-sized products in which an average width dm of the margin portion 114 in the third direction is 200 μm or more, it may be possible to prevent the cracks from being transferred to the capacitance formation portion Ac.

Example 1

Figure 8A:
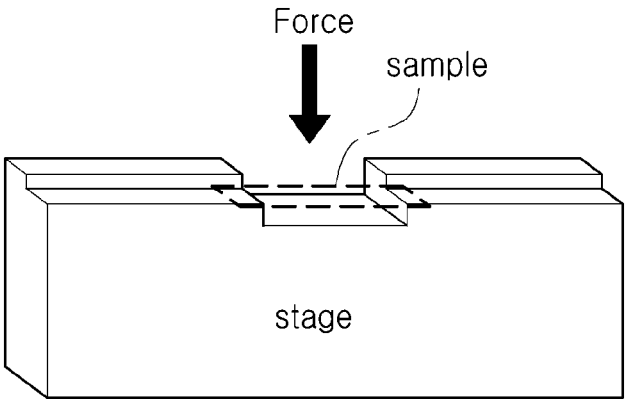
FIG. 8A is a schematic view illustrating a method of measuring 3-point curvature of a sample according to Invention Example and Comparative Example.
Figure 8B:
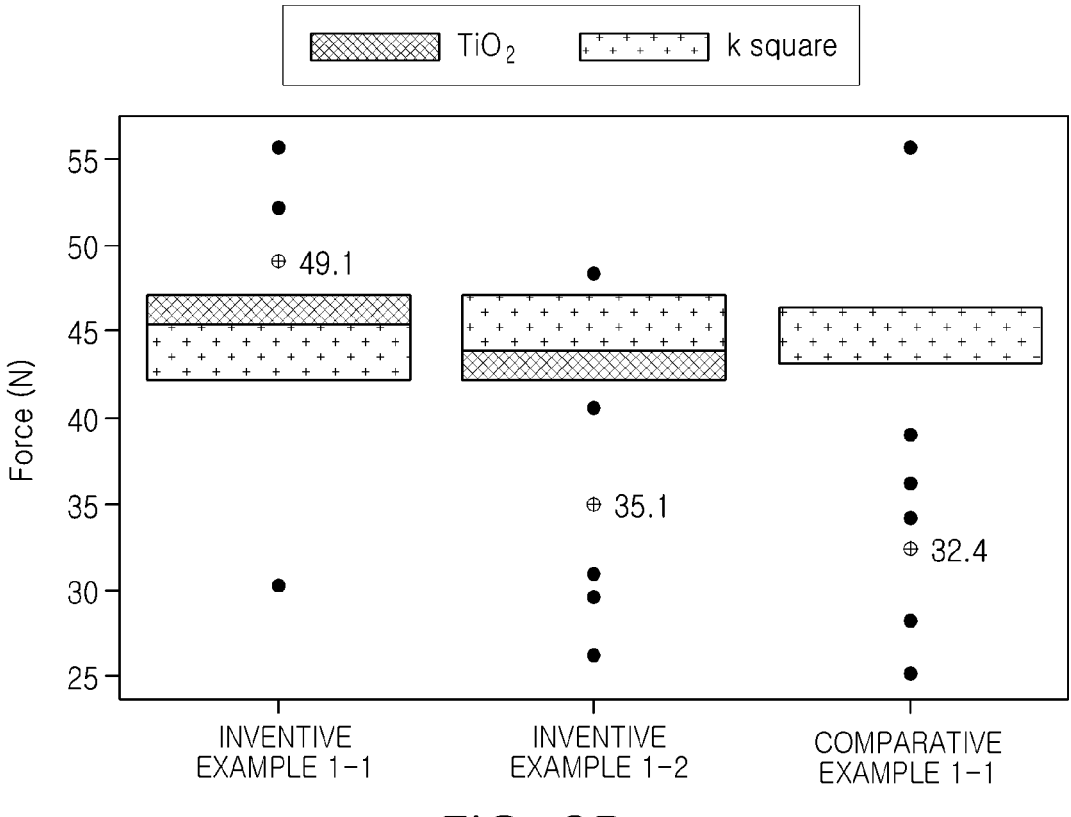
FIG. 8B is a graph illustrating results of measuring the 3-point curvature according to FIG. 8A.

FIG. 8A is a schematic view illustrating a method of measuring 3-point curvature of a sample according to Invention Example and Comparative Example, and FIG. 8B is a graph illustrating results of measuring the 3-point curvature according to FIG. 8A.

Figure 9A:
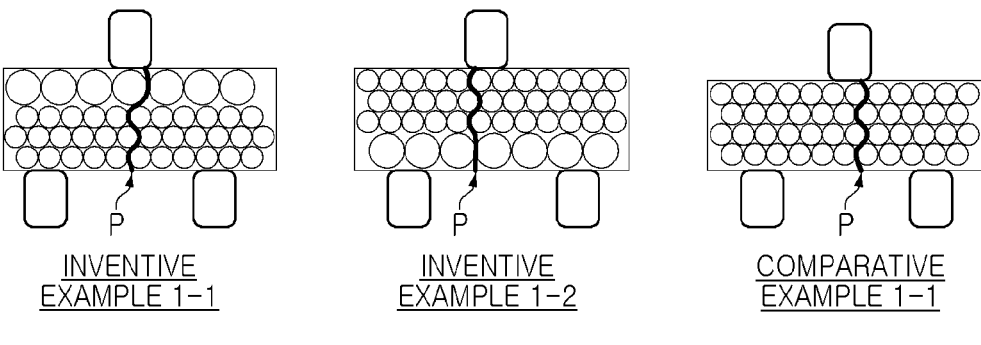
FIGS. 9A and 9B are schematic views illustrating a destruction pattern of a sample expected in a measurement of the 3-point curvature according to FIGS. 8A and 8B.
Figure 9B:
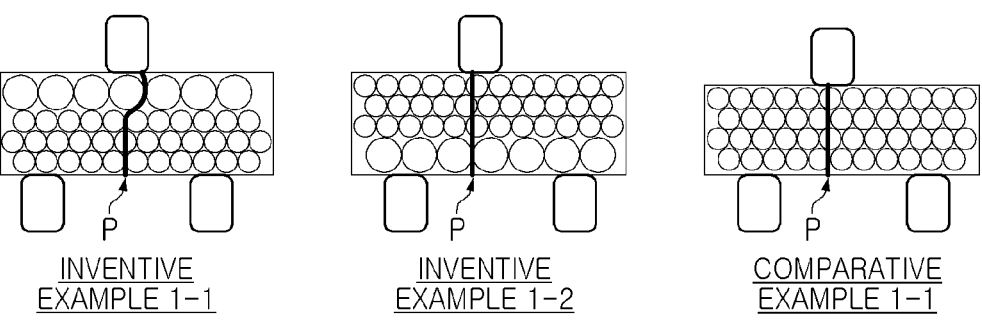

FIGS. 9A and 9B are schematic views illustrating a destruction pattern of a sample expected in a measurement of the 3-point curvature according to FIGS. 8A and 8B.

Inventive Example 1-1 was a case in which a $TiO_2$ layer is formed and sintered on an upper surface of a K-square, Inventive Example 1-2 was a case in which the $TiO_2$ layer is formed and sintered on a lower surface of the K-square, and Comparative Example 1-1 was a case in which the $TiO_2$ layer was not formed on the upper surface or the lower surface of the K-square.

K-square refers to a uniform and isotropic sample including the same components as the dielectric layer 111 according to an embodiment of the present invention and having a size of $10 \times 5 \times 1$ mm$^3$ formed by proceeding to a secondary pre-sintering.

For each sample of Inventive Example 1-1, Inventive Example 1-2, and Comparative Example 1-1, 3-point curvature evaluation was performed as shown in the schematic view illustrated in FIG. 8A, and specifically, the measurement was performed in a manner of recognizing a depth pressed on each sample as force while lowering a jig at a constant speed. After the jig reaches a surface of the sample, applied force increased, and the force (destructive force) at the time of destruction of each sample was measured. Referring to FIG. 8B, it may be configured that in Inventive Example 1-1, an average value of the destructive force is 49.1 (N), in Inventive Example 1-2, an average value of the destructive force is 35.1 (N), and in comparative Example 1-1, an average value of the destructive force is 32.4 (N).

FIG. 9A assumes a case in which destruction occurs at a grain boundary of the dielectric grain in K square, and FIG. 9B assumes a case in which destruction occurs inside the dielectric grain in K square. Inventive Example 1-2 was a case in which the $TiO_2$ layer was formed and sintered on the lower surface of the K-square, which did not differ significantly from Comparative Example 1-1 in terms of a destructive force value, but Inventive Example 1-1 was a case in which the $TiO_2$ layer was formed and sintered on the upper surface of the K-square, and the dielectric grain including in the upper surface thereof was larger than the dielectric grain included in the lower surface thereof, and the grain growth region was formed in a region separated from an initial crack source P by a certain distance, thus changing a transfer path of the cracks. Accordingly, it may be found that Inventive Example 1-1 had the destructive force value higher than that of Comparative Example 1-1.

If these results are applied to the multilayer electronic component 100 according to an exemplary embodiment of the present disclosure, in a case in which the second region 114c which is the grain growth region is disposed in contact with an outermost layer of the margin portion or the capacitance formation portion Ac, this corresponds to Inventive Example 1-2 and has an insufficient effect of changing the transfer path of the cracks, but in a case in which the second region 114c which is the grain growth region is disposed between the first regions 114a and 114b and the third region 114c which are the grain non-growth regions, this corresponds to Inventive Example 1-1 and an excellent effect of changing the transfer path of the cracks.

Example 2

Figures 10A, 10B, 10C:
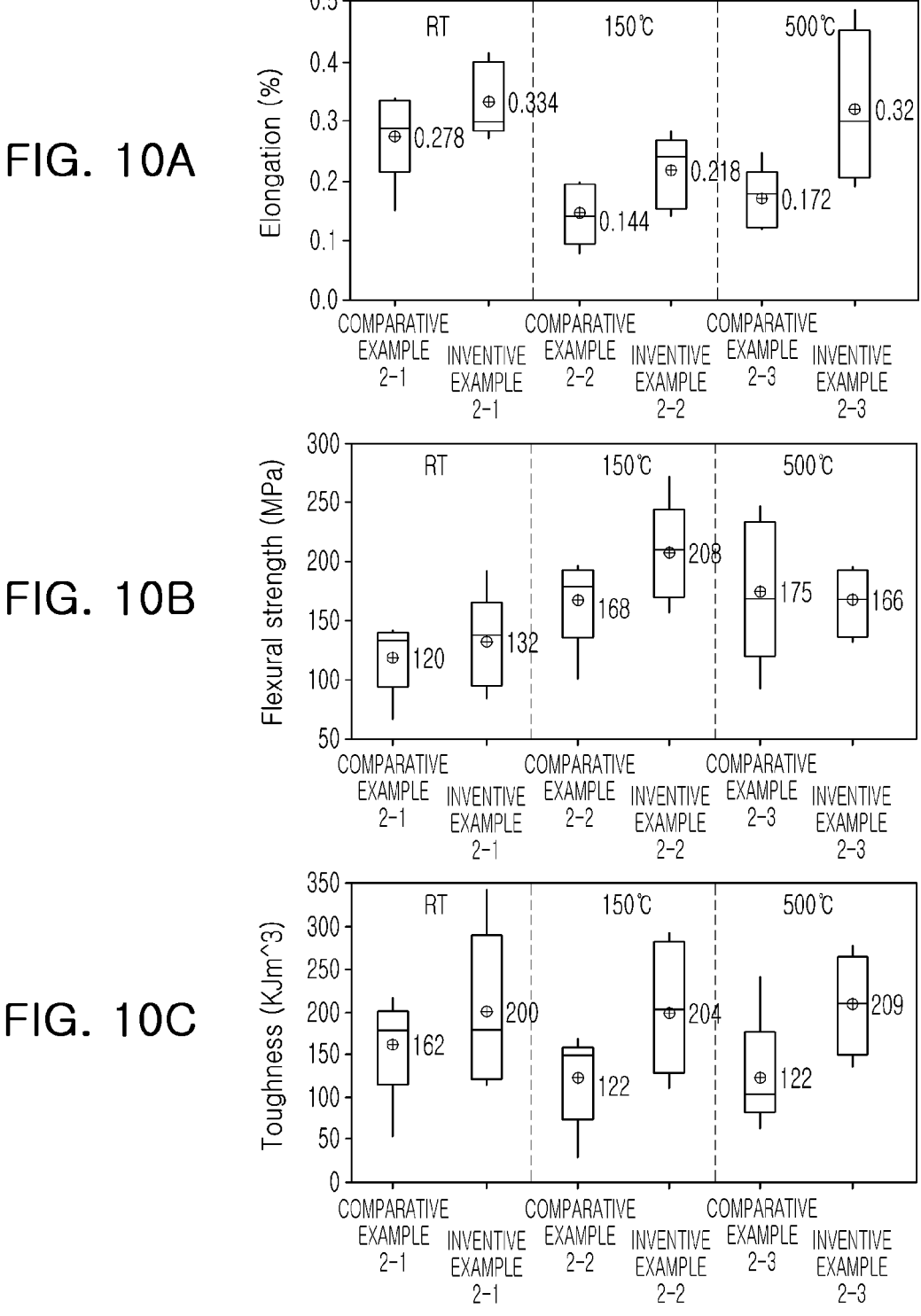
FIGS. 10A, 10B, and 10C are illustrating measurement of changes in characteristics depending on a temperature, in Inventive Example in which $TiO_2$ is applied to an upper surface of a k square and Comparative Example having a K square sample to which $TiO_2$ is not applied.

FIGS. 10A, 10B, and 10C are views illustrating measurement of changes in characteristics depending on a temperature, in Inventive Example in which $TiO_2$ is applied to an upper surface of a k square and Comparative Example having a K square sample to which $TiO_2$ is not applied.

Inventive Examples 2-1, 2-2 and 2-3 used samples in which $TiO_2$ was applied to the upper surface of the k square and the upper surface was sintered, and Comparative Examples 2-1, 2-2 and 2-3 used samples in which the upper surface or the lower surface of the k square was sintered without applying $TiO_2$ to the upper surface or the lower surface.

Comparative Example 2-1 and Inventive Example 2-1 were the results of measuring changes in each characteristic at room temperature (RT), Comparative Example 2-2 and Inventive Example 2-2 were the results of measuring changes in each characteristic at 150° C., and Comparative Example 2-3 and Inventive Example 2-3 were the results of measuring changes in each characteristic at 500° C.

In a three-point curvature evaluation method performed in Inventive Example 1, elongation characteristics is a value obtained by measuring a pressed depth immediately before a fracture of a sample in the three-point curvature test, a value of flexible strength (MPa) was measured as the stress in this case, and toughness was measured by calculating an area of a stress-strain curve in the same measurement method.

Referring to the results of FIGS. 10A, 10B and 10C, it may be confirmed that Inventive Examples 2-1, 2-2 and 2-3 are improved as compared to Comparative Examples 2-1, 2-2 and 2-3 in terms of the elongation strength, the flexible strength, and the toughness.

If these results are applied to the multilayer electronic component 100 according to an exemplary embodiment of the present disclosure, the second region 114c which is the grain growth region may be disposed between the first regions 114a and 114b and the third region 114c which are the grain non-growth regions, and in this case, it may be possible to improve the elongation strength, the flexible strength, and the elongation characteristics of the margin portion 114 itself, thereby suppressing the occurrence of the cracks in the multilayer electronic component 100.

Although examples embodiment of the present disclosure has been described in detail above, the present disclosure is not limited to the above-described embodiments and the accompanying drawings but is defined by the appended claims. Therefore, those of ordinary skill in the art may make various replacements, modifications, or changes without departing from the scope of the present disclosure defined by appended the claims, and these replacements, modifications, or changes should be construed as being included in the scope of the present disclosure.

In addition, the expression 'an exemplary embodiment' used in the present disclosure does not denote the same exemplary embodiment, and is provided to emphasize and explain different unique characteristics. However, the exemplary embodiments presented above do not preclude being implemented in combination with the features of another embodiment. For example, although items described in a specific embodiment are not described in another embodiment, the items may be understood as a description related to another embodiment unless a description opposite or contradictory to the items is in another embodiment.

The terms used in the present disclosure are used only to describe an exemplary embodiment and are not intended to limit the present disclosure. In this case, a singular expression includes plural expressions unless the context clearly indicates otherwise.

What is claimed is:

1. A multilayer electronic component comprising:
a body including a dielectric layer and an internal electrode alternately disposed with the dielectric layer, and including a first surface and a second surface opposing each other in a first direction, a third surface and a fourth surface connected to the first surface and the second surface and opposing each other in a second direction, and a fifth surface and a sixth surface connected to the first surface to the fourth surface and opposing each other in a third direction; and
an external electrode disposed on the body,
wherein the body comprises a capacitance formation portion in which the dielectric layer and the internal electrode are disposed to overlap each other in the first direction, and margin portions disposed on one surface and the other surface of the capacitance formation portion in the third direction,
the margin portions comprise a first region adjacent to the capacitance formation portion, a third region adjacent to an external surface of the margin portion, and a second region disposed between first region and the third region, and
when an average grain size of a dielectric grain included in the first region is referred to as G1, an average grain size of a dielectric grain included in the second region is referred to as G2, and an average grain size of a dielectric grain included in the third region is referred to as G3, G2>G1 and G2>G3 are satisfied.

2. The multilayer electronic component according to claim 1, wherein, when a ratio of a content of Ti ions to a content of Ba ions included in the first region is referred to as C1, a ratio of a content of Ti ions to a content of Ba ions included in the second region is referred to as C2, and a ratio of a content of Ti ions to a content of Ba ions included in the third region is referred to as C3, C2>C1 and C2>C3 are satisfied.

3. The multilayer electronic component according to claim 2, wherein the C1, the C2 and the C3 satisfy C2>C3>C1.

4. The multilayer electronic component according to claim 1, wherein the first region may include a first-first region in contact with the capacitance formation portion and a first-second region adjacent to the second region, and
when a ratio of a content of Ti ions to a content of Ba ions included in the first-first region is referred to as C1-1, and a ratio of a content of Ti ions to a content of Ba ions included in the first-second region is referred to as C1-2, C2>C3>C1-2>C1-1 is satisfied.

5. The multilayer electronic component according to claim 1, wherein, when a ratio of a content of TiO ions to a content of Ba ions included in the first region is referred to as C1', a ratio of a content of TiO ions to a content of Ba ions included in the second region is referred to as C2', and a ratio of a content of TiO ions to a content of Ba ions included in the third region is referred to as C3', C2'>C1'>C3' is satisfied.

6. The multilayer electronic component according to claim 1, wherein an average width of the margin portion in the third direction is 200 μm or more.

7. The multilayer electronic component according to claim 1, wherein G2 is 2 μm or more and 5 μm or less.

8. The multilayer electronic component according to claim 1, wherein an average distance in the third direction from an external surface of the margin portion to one end of the second region in the third direction adjacent to the external surface of the margin portion is 30 μm or more and 50 μm or less.

9. The multilayer electronic component according to claim 1, wherein an average distance in the third direction from one end of the second region in the third direction adjacent to an external surface of the margin portion to the other end of the second region in the third direction is 20 μm or more and 150 μm or less.

10. A multilayer electronic component comprising:
a body including a dielectric layer and an internal electrode alternately disposed with the dielectric layer, and including a first surface and a second surface opposing each other in a first direction, a third surface and a fourth surface connected to the first surface and the second surface and opposing each other in a second direction, and a fifth surface and a sixth surface connected to the first surface to the fourth surface and opposing each other in a third direction; and
an external electrode disposed on the body,
wherein the body comprises a capacitance formation portion in which the dielectric layer and the internal electrode are disposed to overlap each other in the first direction, and margin portions disposed on one surface and the other surface of the capacitance formation portion in the third direction,
the margin portions comprise a first region adjacent to the capacitance formation portion, a third region adjacent to an external surface of the margin portion, and a second region disposed between first region and the third region, and
when a ratio of a content of Ti ions to a content of Ba ions included in the first region is referred to as C1, a ratio of a content of Ti ions to a content of Ba ions included in the second region is referred to as C2, and a ratio of a content of Ti ions to a content of Ba ions included in the third region is referred to as C3, C2>C1 and C2>C3 are satisfied.

11. The multilayer electronic component according to claim 10, wherein the C1, the C2, and the C3 satisfy C2>C3>C1.

12. The multilayer electronic component according to claim 10, wherein the first region includes a first-first region in contact with the capacitance formation portion and a first-second region adjacent to the second region, and
when a ratio of a content of Ti ions to a content of Ba ions included in the first-first region is referred to as C1-1, and a ratio of a content of Ti ions to a content of Ba ions included in the first-second region is referred to as C1-2, C2>C3>C1-2>C1-1 is satisfied.

13. The multilayer electronic component according to claim 10, wherein, when a ratio of a content of TiO ions to a content of Ba ions included in the first region is referred to as C1', a ratio of a content of TiO ions to a content of Ba ions included in the second region is referred to as C2', and a ratio of a content of TiO ions to a content of Ba ions included in the third region is referred to as C3', C2'>C1'>C3' is satisfied.

14. The multilayer electronic component according to claim 10, wherein an average width of the margin portion in the third direction is 200 μm or more.

15. The multilayer electronic component according to claim 10, wherein, when an average grain size of a dielectric grain included in the second region is referred to as G2, G2 is 2 μm or more and 5 μm or less.

16. The multilayer electronic component according to claim 10, wherein an average distance in the third direction from the external surface of the margin portion to one end of the second region in the third direction adjacent to the external surface of the margin portion is 30 μm or more and 50 μm or less.

17. The multilayer electronic component according to claim 10, wherein an average distance in the third direction from one end of the second region in the third direction adjacent to the external surface of the margin portion to the other end of the second region in the third direction is 20 μm or more and 150 μm or less.

* * * * *